UNITED STATES PATENT OFFICE.

JULIUS STOCKHAUSEN, OF CREFELD, GERMANY.

CARBON-TETRACHLORID PREPARATION AND PROCESS FOR ITS PRODUCTION.

No. 845,322.     Specification of Letters Patent.     Patented Feb. 26, 1907.

Application filed January 19, 1906. Serial No. 296,809.

*To all whom it may concern:*

Be it known that I, JULIUS STOCKHAUSEN, a citizen of Germany, residing at Crefeld, Germany, have invented a new and useful Carbon-Tetrachlorid Preparation and Process for its Production; and I do hereby declare the following to be a full, clear, and exact description of the same.

My invention relates to a carbon-tetrachlorid preparation and to the process for its production.

According to the process there is produced an anhydrous concentrated preparation of carbon-tetrachlorid which is suitable for storing and transport and is also suited for chemical washing and similar operations either alone or in combination with known extraction mediums. The preparation forms a clear solution in water and gives in a greater quantity good emulsions with water.

The process of manufacture consists in dissolving alkali compounds of sulfonated fats or oils in carbon-tetrachlorid. It is advisable for this purpose to use the known gelatinous soap, which is obtained by the saponification of sulfonated resin-oil or other equivalent sulfonated fats and oils with at least six per cent. (calculated on the weight of the sulfonated fats or oils) of sodium hydrate or a corresponding quantity of other alkalies or saponifying mediums and by heating of the mixture. In order more quickly to produce the new carbon-tetrachlorid preparation, the alkali soaps of the sulfonated fats or oils can also be heated with carbon-tetrachlorid in an apparatus fitted with a reflux-condenser.

By the addition of alkali to the preparation its clear solubility in water is sensibly increased and a soap-like character imparted thereto, which is of importance in many applications.

The practical carrying out of the invention may, for example, be realized as follows: One part of the gelatinous soap produced by the saponification of sulfonated resin-oil boiled with sixty per cent. of soda-lye of 36°–37° Baumé is dissolved either warm or cold in about one part of carbon-tetrachlorid and then heated in an apparatus fitted with a reflux-condenser until the mixture becomes clear and homogeneous. The deposit formed in many cases can be allowed to settle and be used again on account of the carbon-tetrachlorid which it contains. The preparation so obtained dissolves clearly in water. With a larger admixture of carbon-tetrachlorid opalescent solutions to milky turbidities are formed. By the addition of alkali in not too excessive quantities the clear solution of the preparation in water is facilitated. The extra alkali may be added to the alkaline compound of the sulfonated oils before, during, or after such solution.

Having thus described my invention, what I claim as such, and desire to secure by Letters Patent, is—

1. The process for the production of a carbon-tetrachlorid preparation, which consists in the saponification of sulfonated resin-oil with at least six per cent. of soda hydrate and in the heating of the mixture and its solution in carbon-tetrachlorid, as above described.

2. A carbon-tetrachlorid preparation, consisting of carbon-tetrachlorid and a gelatinous soap obtained by saponification of resin-oil with at least six per cent. of sodium hydrate, and the heating of the same, as above described.

In testimony whereof I have signed my name to this specification in the presence of two witnesses.

JULIUS STOCKHAUSEN.

Witnesses:
   W. BRUCE WALLACE,
   Mrs. T. R. WALLACE.